(12) United States Patent
Freijedo Fernández

(10) Patent No.: US 12,463,522 B2
(45) Date of Patent: Nov. 4, 2025

(54) CONTROLLING A CASCADED MULTILEVEL CONVERTER

(71) Applicant: HUAWEI TECHNOLOGIES CO., LTD., Guangdong (CN)

(72) Inventor: Francisco Daniel Freijedo Fernández, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 496 days.

(21) Appl. No.: 17/941,169

(22) Filed: Sep. 9, 2022

(65) Prior Publication Data

US 2023/0006535 A1 Jan. 5, 2023

Related U.S. Application Data

(63) Continuation of application No. PCT/EP2020/056658, filed on Mar. 12, 2020.

(51) Int. Cl.
*H02M 1/00* (2007.01)
*H02M 7/483* (2007.01)
*H02M 7/5387* (2007.01)

(52) U.S. Cl.
CPC ........ *H02M 1/0025* (2021.05); *H02M 1/0009* (2021.05); *H02M 1/007* (2021.05); *H02M 7/4835* (2021.05); *H02M 7/53873* (2013.01)

(58) Field of Classification Search
CPC .... H02M 1/007; H02M 1/025; H02M 1/0009; H02M 1/325; H02M 7/4835; H02M 7/4833; H02M 7/53873; H02J 3/1857
See application file for complete search history.

(56) References Cited

U.S. PATENT DOCUMENTS

| | | |
|---|---|---|
| 9,142,963 B2 | 9/2015 | Hasler et al. |
| 9,621,070 B2 | 4/2017 | Barbosa et al. |

(Continued)

FOREIGN PATENT DOCUMENTS

| | | | |
|---|---|---|---|
| CN | 103326393 A | 9/2013 | |
| CN | 110247565 A * | 9/2019 | ................ H02J 3/38 |

(Continued)

OTHER PUBLICATIONS

R. Lizana, M. A. Perez, D. Arancibia, J. R. Espinoza and J. Rodriguez, "Decoupled Current Model and Control of Modular Multilevel Converters," in IEEE Transactions on Industrial Electronics, vol. 62, No. 9, pp. 5382-5392, Sep. 2015, doi: 10.1109/TIE.2015.2405900.*

(Continued)

*Primary Examiner* — Thienvu V Tran
*Assistant Examiner* — Yahveh Comas Torres

(57) ABSTRACT

A cascaded multilevel converter is disclosed. The converter comprises a plurality of modules coupled together to form a branch, each of the modules comprising a switching circuit and a DC link for supplying a DC voltage to the switching circuit. The converter further comprises a controller for controlling the switching circuit of each module to generate an AC voltage in the branch, wherein the controller is configured to: determine, for each module, a voltage across a capacitor of the DC link of the module; determine, for each module, a reference power value for charging the capacitor of the DC link of the module to a reference voltage value for the module; determine, from the reference power values of the modules, a common reference AC current value for AC current in the branch; and determine, from the common reference AC current value, a common reference AC voltage value for an AC voltage in the branch.

16 Claims, 7 Drawing Sheets

(56) References Cited

U.S. PATENT DOCUMENTS

| | | | |
|---|---|---|---|
| 9,923,446 B2 | 3/2018 | Townsend et al. | |
| 10,938,320 B2* | 3/2021 | Guo | H02M 7/4833 |
| 11,277,076 B2* | 3/2022 | Dallmer-Zerbe | H02M 7/4833 |
| 11,757,377 B2* | 9/2023 | Toi | H02M 7/4835 |
| | | | 307/105 |
| 11,837,969 B2* | 12/2023 | Alvarez Valenzuela | |
| | | | H02M 7/4835 |
| 2009/0102436 A1* | 4/2009 | Escobar Valderrama | |
| | | | H02J 3/1857 |
| | | | 323/207 |
| 2013/0063981 A1 | 3/2013 | Dujic et al. | |
| 2015/0180352 A1 | 6/2015 | Mester et al. | |
| 2016/0308357 A1* | 10/2016 | Yuan | H02M 7/4835 |
| 2022/0337173 A1* | 10/2022 | Nakamura | H02M 7/797 |

FOREIGN PATENT DOCUMENTS

| | | | |
|---|---|---|---|
| CN | 110350788 A * | 10/2019 | |
| EP | 2568589 B1 | 11/2013 | |
| EP | 2883300 A1 | 6/2015 | |
| EP | 3518405 A1 * | 7/2019 | |
| WO | 2012016592 A1 | 2/2012 | |
| WO | 2014023331 A1 | 2/2014 | |
| WO | 2014181081 A1 | 11/2014 | |
| WO | WO-2018233819 A1 * | 12/2018 | |

OTHER PUBLICATIONS

M. A. Perez, F. Ruiz, J. R. Espinoza and M. Malinowski, "Control of Solid State Transformer based on Modular Multilevel Converters with Interconnecting Dual Active Bridges," 2019 IEEE 28th International Symposium on Industrial Electronics (ISIE), Vancouver, BC, Canada, Jun. 12-14, 2019, pp. 2343-2348, doi: 10.1109.*

Lüth T et al.: "A DC/DC converter suitable for HVDC applications with large step-ratios 2014 IEEE Energy Conversion Congress and Exposition(ECCE)" IEEE Sep. 14, 2014 (Sep. 14, 2014), pp. 5331-5338. XP032680378.*

Machine Translation CN-110247565-A (Year: 2019).*
Machine Translation CN-110350788-A (Year: 2019).*

M. A. Perez, F. Ruiz, J. R. Espinoza and M. Malinowski, "Control of Solid State Transformer based on Modular Multilevel Converters with Interconnecting Dual Active Bridges," 2019 IEEE 28th International Symposium on Industrial Electronics (ISIE), Vancouver, BC, Canada, Jun. 12-14, 2019, pp. 2343-2348, doi: 10.1109/ISIE. 2019.8781544.

Communication pursuant to Article 94(3) EPC issued in EP20711146. 9, dated Nov. 23, 2023, 7 pages.

Lüth T et al.: "A DC/DC converter suitable for HVDC applications with large step-ratios 2014 IEEE Energy Conversion Congress and Exposition(ECCE)" IEEE Sep. 14, 2014 (Sep. 14, 2014), pp. 5331-5338. XP032680378.

[Saeed2018] M. Saeed, J. M. Cuartas, A. Rodriguez, M. Arias, and F. Briz, Energization and start-up of CHB-Based modular three-stage solid-state transformers, IEEE Transactions on Industry Applications, vol. 54, pp. 5483-5492, Sep. 2018.

Zongbin Ye et al, A Novel DC-Power Control Method for Cascaded H-Bridge Multilevel Inverter, 6874 IEEE Transactions on Industrial Electronics, vol. 64, No. 9, Sep. 2017, 11 pages.

[Zare2002] F. Zare and G. Ledwich, A hysteresis current control for single-phase multilevel voltage source inverters: Pld implementation, IEEE Transactions on Power Electronics, vol. 17, pp. 731-738, Sep. 2002.

Ricardo P. Aguilera et al., Predictive Control of Cascaded H-BridgeConverters Under UnbalancedPower Generation, 4 IEEE Transactions on Industrial Electronics, vol. 64, No. 1, Jan. 2017, 10 pages.

[Hur2001] N. Hur, J. Jung, and K. Nam, A fast dynamic dc-link power-balancing scheme for a pwm converter-inverter system, IEEE Transactions on Industrial Electronics, vol. 48, pp. 794-803, Aug. 2001.

Hirofumi Akagi et al., Control and Performance of a TransformerlessCascade PWM STATCOM With Star Configuration, IEEE Transactions on Industry Applications, vol. 43, No. 4, Jul./Aug. 2007, 9 pages.

[Liu2018] J. Liu and N. Zhao, Improved fault-tolerant method and control strategy based on reverse charging for the power electronic traction transformer, IEEE Transactions on Industrial Electronics, vol. 65, pp. 2672-2682, Mar. 2018.

Meng-jiang Tsai et al, DC Bus Balancing Control Techniques for the Cascaded Neutral Point Clamped Modular Converter, 2016, 8 pages.

[Wang2016]L. Wang, D. Zhang, Y.Wang, B.Wu, and H. S. Athab, Power and voltage balance control of a novel three-phase solid-state transformer using multilevel cascaded h-bridge inverters for microgrid applications, IEEE Transactions on Power Electronics, vol. 31, pp. 3289-3301, Apr. 2016.

[Busquets-Monge2015] S. Busquets-Monge, R. Gri, J. Nicolas-Apruzzese, and J. Bordonau, Decoupled dc-link capacitor voltage control of dc-ac multilevel multileg converters, IEEE Transactions on Industrial Electronics, vol. 63, pp. 1344-1349, Mar. 2016.

[Freijedo2009] F. D. Freijedo, Contributions to Grid-Synchronization Techniques for Power Electronic Converters PhD Thesis, University of Vigo, Vigo, Spain, Jun. 9, 2009.

[Rodriguez-Diaz2018] E. Rodriguez-Diaz, F. D. Freijedo, J. M. Guerrero, J. Marrero-Sosa, and D. Dujic, Input-admittance passivity compliance for grid-connected converters with an lcl filter, IEEE Transactions on Industrial Electronics, vol. 66, pp. 1089-1097, Feb. 2019.

H. Akagi, "Classification, Terminology, and Application of the Modular Multilevel Cascade Converter (MMCC)," in IEEE Transactions on Power Electronics, vol. 26, No. 11, pp. 3119-3130, Nov. 2011, doi: 10.1109/TPEL.2011.2143431.

International Search Report and Written Opinion issued in PCT/EP2020/056658, dated Mar. 12, 2020, 11 pages.

* cited by examiner

CONTROLLING A CASCADED MULTILEVEL CONVERTER

CROSS-REFERENCE TO RELATED APPLICATIONS

This application is a continuation of International Application No. PCT/EP2020/056658, filed on Mar. 12, 2020, the disclosure of which is hereby incorporated by reference in its entirety.

TECHNICAL FIELD

The present disclosure relates to a cascaded multilevel converter and a method of controlling a cascaded multilevel converter.

BACKGROUND

Cascaded multilevel converters are power electronic devices used for providing an alternating voltage level at the output using multiple lower level DC voltages as an input. One application of cascaded multilevel converters is in solid state transformers, used in electrical power transmission and distribution grids in place of conventional line-frequency transformers for interfacing different AC voltage levels.

A cascaded multilevel converter comprises plural inverter modules, each module comprising a plurality of power electronics switches operable to generate an AC output from the DC input by controlling the switching sequence of the switches. The AC outputs of the plural inverter modules are cascaded, i.e. connected in series, to form a branch, such that the AC output voltage in the branch is synthesised by the sum of the outputs of the inverter modules. Each inverter module is supplied with a DC voltage by an individual DC-link, which may, for example, be coupled to a DC voltage output of a rectifier circuit. This cascaded structure has a number of advantages. Firstly, because the AC output voltages of the modules add in the branch, each module is only required to be capable of handling relatively low voltages and power, thereby allowing the use at the module level of low voltage power electronics components in medium/high voltage converter applications. Further, the power quality of the AC output signal in the branch may be improved relatively easily, simply by adding additional modules in the cascade, to thereby increase the number of different voltage levels available for synthesising the AC output signal, resulting in reduced harmonic distortion in the output signal.

However, the aforementioned advantages of cascaded multilevel converters come at the expense of increasing complexity, both in terms of topology of the circuit and control of the multiple inverter modules. Considering in particular the control of the inverter modules, it is desirable to achieve independent control of the individual DC-link voltages which feed the inverter modules. For example, independent control of the DC-link voltages enables maintaining equal charge in the DC-links of each inverter modules in a branch, which may advantageously prevent modules from exceeding their operating range, even under unequal inter-module load conditions and DC-link capacitance values. Further, independent control of the DC-link voltages may advantageously allow for detection and isolation of a faulty module, thereby allowing continued operation of the converter even in the event of failure of one or more of the constituent modules.

SUMMARY

An objective of the present disclosure is to provide a cascaded multilevel converter in which switching sequences of inverter stages are controlled in dependence on a determination of the voltages of the individual DC-link circuits. This may advantageously achieve good decoupling of the dynamics of the DC-link circuits, allow independent control of the individual DC-link voltages, and/or facilitate fault detection, and accordingly module isolation, on an individual module-level.

The foregoing and other objectives are achieved by the features of the independent claims. Further implementation forms are apparent from the dependent claims, the description and the Figures.

A first aspect of the present disclosure provides a cascaded multilevel converter comprising a plurality of modules coupled to form a branch, each of the modules comprising a switching circuit and a DC-link for supplying a DC voltage to the switching circuit, and a controller for controlling the switching circuit of each module to generate an AC voltage in the branch, wherein the controller is configured to: determine for each module a voltage across a capacitor of the DC-link of the module, determine for each module a reference power value for charging the capacitor of the DC-link of the module to a reference voltage value for the module, determine, from the reference power values of the modules, a common reference AC current value for AC current in the branch, determine, from the common reference AC current value, a common reference AC voltage value for AC voltage in the branch, determine for each module a reference AC voltage value using the common reference AC voltage value and the reference power value for the module, and generate a pulse width modulation signal for controlling the switching circuit of each module based on the reference AC voltage value for the module and the voltage across the capacitor of the module.

The switching circuit of each module may thus be controlled by the controller to generate an AC voltage output in the branch from the DC voltage input supplied by the DC-link. The controller calculates the switching circuit duty cycle by generation of a suitable pulse width modulation signal. The pulse width modulation signal is generated in dependence on both the AC voltage reference and the determined voltage across the capacitor of each individual DC-link. Taking account of individually determined DC-link voltages in the control of the switching circuits advantageously achieves good decoupling of the dynamics of the DC-link circuits and allows independent control of the DC-link voltages. Furthermore, determining the individual DC-link voltages may advantageously enable fault detection on an individual module level, thereby facilitating bypassing of a faulty module without causing failure of the complete converter. In the present disclosure, just a single current control task is implemented, in recognition that the current draw through each of the modules should be the same. In other words, only a single current reference and current control task is implemented for all of the modules in the branch. The switching circuit of one or each module could be implemented by a half-bridge circuit, or more preferably by a full-bridge circuit.

The voltage across the capacitor of the DC-link of each module could, for example, be determined by measuring the voltage across the capacitor using a voltage sensor. The controller of the converter could comprise a plurality of devices each performing a subset of the various tasks, or alternatively the tasks could be performed by one or more multi-tasking devices. The capacitor of the DC-link could be formed by a single capacitor component, or alternatively could comprise more than one capacitor coupled in series, i.e. as used herein the term 'capacitor' should be understood to mean 'equivalent capacitor'.

In an implementation, the reference voltage value for each module may be a predetermined value stored in memory in the controller. The use of a predetermined value for the reference voltage, e.g. a manually defined value set in the controller, advantageously allows for setting of a reference voltage that is optimised for the particular application in which the converter is deployed. For example, the reference voltage value may be set by taking into account the output AC voltage and the power ratings of the components of the converter.

In an implementation, the reference power value for each module may be determined based on a difference between squared values of the voltage across the capacitor of the DC-link of the module and the reference voltage value for the module. Because both the determined and reference voltage values are squared prior to determination of the per-module reference power value, the inputs of the control loop each is linearly proportional to the energy stored in the corresponding DC-link capacitor.

In an implementation, the controller may comprise a reference current control device configured to receive the reference power values for each of the plurality of modules and determine the common reference AC current value. In other words, the current control task could be implemented by a single device having view of all of the power references in the branch. Implementing all current control tasks on the same device, rather than for example on a plurality of physically distributed devices, may advantageously minimise latencies in communication between devices conducting different tasks. Delays in the response of the converter to instructions from the controller may thereby be reduced, along with delays in the response of the controller to changes in the operation of the converter.

In an implementation, the controller may comprise a plurality of switching circuit control devices each configured to receive the reference AC voltage value of one of the plurality of modules and control the switching circuit of that module. The plurality of switching circuit control devices may be assigned to respective modules, such that each device receives the reference AC voltage value for a module and calculates the duty-cycle for generation of a pulse-width modulation signal to control the switching circuit of that module. In other words, the duty cycle calculation is implemented by individual control devices at module level. This may advantageously reduce latencies in communication between the duty cycle calculation device and the switching circuit of the module. Delays in the response of the converter to instructions from the controller may thereby advantageously be reduced, along with delays in the response of the controller to changes in the operation of the converter.

In an implementation, the controller may be configured to: control the switching circuits of each module in accordance with an initial mode of operation, determine the power demands of each of the modules, determine whether each of the modules has a power demand of the same sign, and control the switching circuits of each module in accordance with the method if each of the modules has a power demand of the same sign. In other words, the controller may control the switching circuits of the modules in accordance with a first mode operation if the power demands of the modules are mutually different. For example, in this first mode of operation, the switching circuits could be controlled in accordance with a conventional clustered mode of operation, in which the reference voltage of each DC-link is set in the controller as an average of the total branch voltage. This may advantageously avoid spurious operation of the switching circuits where one or more of the modules has a power demand of a different sign to another one of the modules.

In an implementation, the controller may be further configured to compare the voltage of at least one of the modules to a predetermined threshold voltage, and, in response to the voltage of the module being higher or lower than the threshold voltage, configure the module to form a path for AC voltage in the branch that bypasses the DC-link of the module. The predetermined threshold voltage values may be set as voltage values to be expected of the module in normal operation for the application. Accordingly, if the determined voltage does not match the predetermined voltage values, it may be inferred that the module itself is faulty, or that the voltage determined for that module is incorrect, and bypass the faulty module. This may advantageously facilitate continued operation of the converter even where one or more modules are faulty, thereby avoiding complete failure of the system. For example, the DC-link of the module could be bypassed by suitable configuration of the switching circuit such that the path for AC voltage in the branch bypasses the DC-link. This mode of bypassing is reliant, however, on the switching circuit being sufficiently operable to adopt the bypass configuration. It may thus be desirable for example to provide dedicated means for bypassing even the switching circuit of the module. The controller may in actuality be configured to compare the voltage of more than one, and preferably each, of the modules to a predetermined threshold voltage, and implement the bypass operation for each of the more than one modules. Accordingly, failure of each of the modules may be accommodated, thereby providing improved resilience.

In an implementation, the module may comprise a relay operable by the controller to bypass the switching circuit of the module, wherein configuring the module to form a path for AC voltage in the branch that bypasses the DC-link of the module comprises configuring the relay to bypass the switching circuit of the module. The provision of an auxiliary relay for bypassing the switching circuit of the module provides additional resilience to the converter, inasmuch that the module may be bypassed even in a situation where the switching circuit is not sufficiently operable to adopt a bypass configuration. In particular, a relay may be expected to be more mechanically robust than switches of the switching circuit, and may thus be less prone to failure than the switches of the switching circuit. Thus, in this implementation, even if the switches of the switching circuit are inoperative, the module may still be effectively bypassed. Each of the modules may preferably comprise a relay for bypassing the switching circuit of the module.

In an implementation, each of the switching circuits may be configured as an H-bridge. An H-bridge circuit may advantageously exhibit relatively simple control characteristics. In particular, the plural switching devices of an H-bridge circuit may advantageously be controlled by a single common signal.

In an implementation, the cascaded multilevel converter may further comprise a plurality of further modules coupled to form a further branch, each of the plurality of further modules comprising a switching circuit and a DC-link for supplying a DC voltage to the switching circuit, and a controller for controlling the switching circuit of each further module to generate an AC voltage in the further branch, wherein the further branch is arranged in parallel to the branch.

In other words, the multilevel converter could be configured as a multiphase multilevel converter, having multiple branches for supplying multiple phases of AC power. The converter could even comprise more than one further branch, for example, two further branches, such that the converter is suitable for supplying three-phase AC power. The controller(s) could be configured to control the switching circuits of the further branches in the same mode as the mode of controlling the switching circuits of the modules of the branch. The controller could comprise a common system for controlling the switching circuits of each of the multiple branches and the further branches.

In an implementation, each of the multiple branches and the one or more further branches may have the same number of modules. In a multiphase system the power supplied by each of the phases is typically mutually the same. Employing a same number of modules to meet the power demand in each phase may advantageously simplify the design and control of the system.

In an implementation, the reference power value for each module may be determined using a digital filter.

In an implementation, the controller may be configured to compare the reference power value to a threshold power value and implement an anti-windup operation if the reference power value exceeds the threshold power value. In other words, if the DC-link controller reports an unfeasibly high-power demand, it may be inferred that the operation of the DC-link controller is impaired, and the anti-windup operation may thus involve resetting the memory of the digital filter. For example, the threshold power value could be a predetermined value stored in memory of the controller representing an expected upper threshold power demand for the particular application, and the controller may be configured to compare the reference power value per module to the threshold value.

A second aspect of the present disclosure provides a method of controlling a cascaded multilevel converter comprising a plurality of modules coupled to form a branch, each of the modules comprising a switching circuit and a DC-link for supplying a DC voltage to the switching circuit, the method comprising: determining for each module a voltage across a capacitor of the DC-link of the module, determining for each module a reference power value for charging the capacitor of the DC-link of the module to a reference voltage value for the module, determining, from the reference power values of the modules, a common reference AC current value for AC current in the branch, determining from the common reference AC current value, a common reference AC voltage value for AC voltage in the branch, determining for each module a reference AC voltage value using the common reference AC voltage value and the reference power value for the module, and generating a pulse width modulation signal for controlling the switching circuit of each module based on the reference AC voltage value for the module and the voltage across the capacitor of the module.

A third aspect of the present disclosure provides a controller for controlling a cascaded multilevel converter to generate an AC voltage in an output branch, wherein the controller is configured to: determine for each module of the converter a voltage across a capacitor of a DC-link of each module, determine for each module a reference power value for charging a capacitor of the DC link of the module to a reference voltage value for the module, determine, from the reference power values of the modules, a common reference AC current value for AC current in the output branch, determine, from the common reference AC current value, a common reference AC voltage value for AC voltage in the output branch, determine for each module a reference AC voltage value using the common reference AC voltage value and the reference power value for the module, and generate a pulse width modulation signal for controlling a switching circuit of each module based on the reference AC voltage value for the module and the voltage across the capacitor of the module.

These and other aspects of the disclosure will be apparent from the embodiment(s) described below.

BRIEF DESCRIPTION OF THE DRAWINGS

In order that the present disclosure may be more readily understood, embodiments of the disclosure will now be described, by way of example, with reference to the accompanying drawings, in which.

DETAILED DESCRIPTION

A cascaded multilevel converter embodying an aspect of the present disclosure is illustrated schematically in the Figures.

Figure 1:
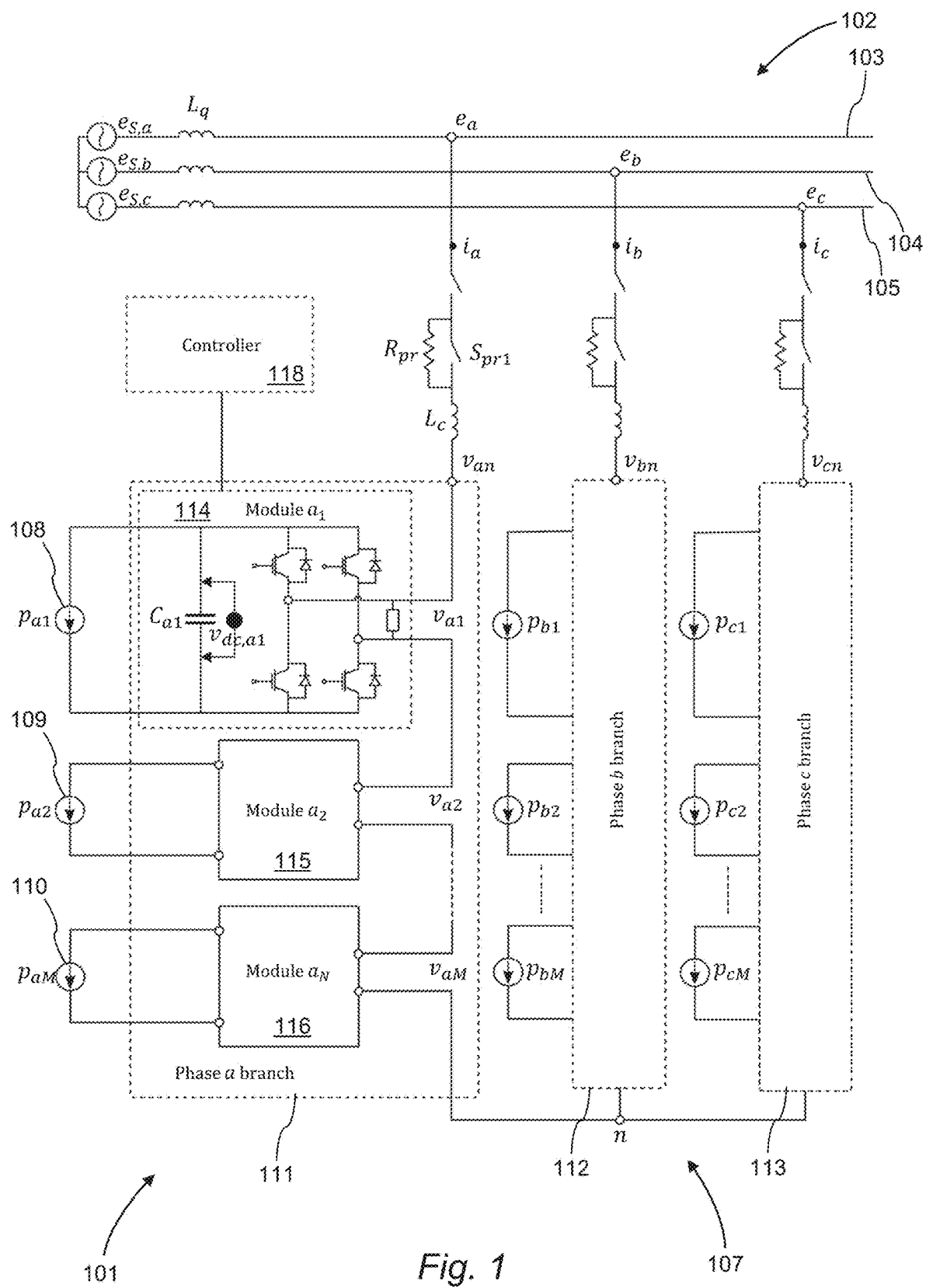
FIG. 1 shows schematically an example of a solid-state transformer comprising a cascaded H-bridge (CHB) multilevel converter embodying an aspect of the disclosure.

Referring firstly to FIG. 1, outputs of a solid-state transformer 101 are coupled to a three-phase power transmission grid 102 comprising grid conductors 103, 104 and 105 for conducting 'a', 'b' and 'c' phases respectively of electrical current. The solid-state transformer 101 comprises a multilevel converter 107 for converting plural DC voltage sources 108, 109 and 110, for example provided by discrete outputs of an initial rectifier stage, to AC voltage for supply to the transmission grid 102.

The multilevel converter 107 comprises Q branches, in the example three, 111, 112 and 113, for supplying 'a', 'b' and 'c' phase AC voltages respectively to the grid conductors 103, 104, 105 respectively. In the example, therefore, the multilevel converter 107 is configured as a three-phase converter for outputting three-phase electrical current. Each branch 111, 112, 113 of the converter 107 is substantially identical in construction. For brevity therefore only branch 111, configured for supplying the 'a' phase current to grid conductor 103, will be described in detail herein, on the understanding that substantially the same teachings apply to branches 112 and 113, responsible for suppling the 'b' and 'c' phase currents respectively to grid conductors 104, 105 respectively.

Branch 111 of the multilevel converter 107 comprises a plurality of inverter modules, such as M inverter modules including module 1 denoted 114, module 2 denoted 115, and module M denoted 116, having their outputs coupled in series to a common conductor 117, such that the AC output voltages of each of the inverter modules 114 to 116 sum on the conductor 117. A controller 118 is provided for controlling the operation of each of the inverter modules 114 to 116 in the branch 111. The plurality of inverter modules 114 to 116 are substantially similar in construction, save for practically unavoidable differences resulting from imperfect tolerance in the various components, and are operated in substantially the same way. Again, for brevity, therefore only inverter module 114 will be described in detail herein, on the understanding that substantially the same teachings apply to each of the other M modules in the branch. In the example, the multilevel converter has a three-phase cascaded H-bridge configuration.

Figure 2:
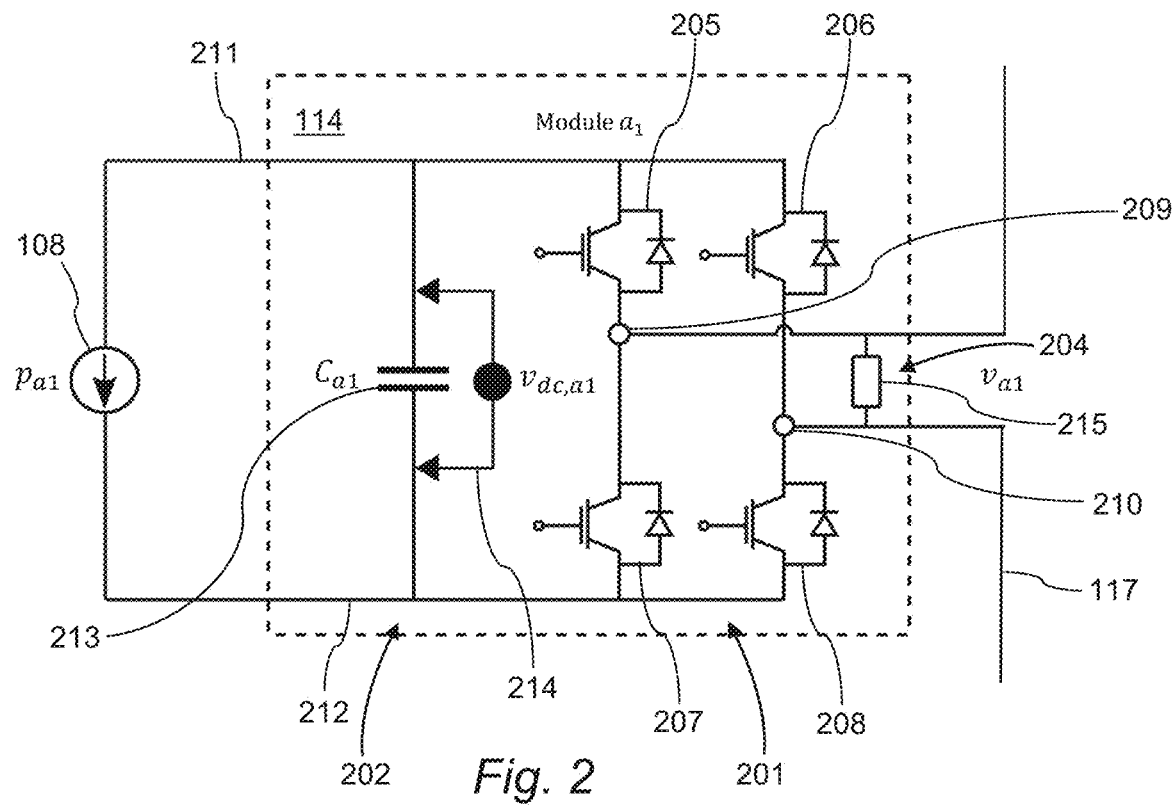
FIG. 2 shows schematically an inverter module of the CHB multilevel converter identified in FIG. 1 comprising a DC-link for suppling a DC voltage to a switching circuit of the module.
Figure 3:
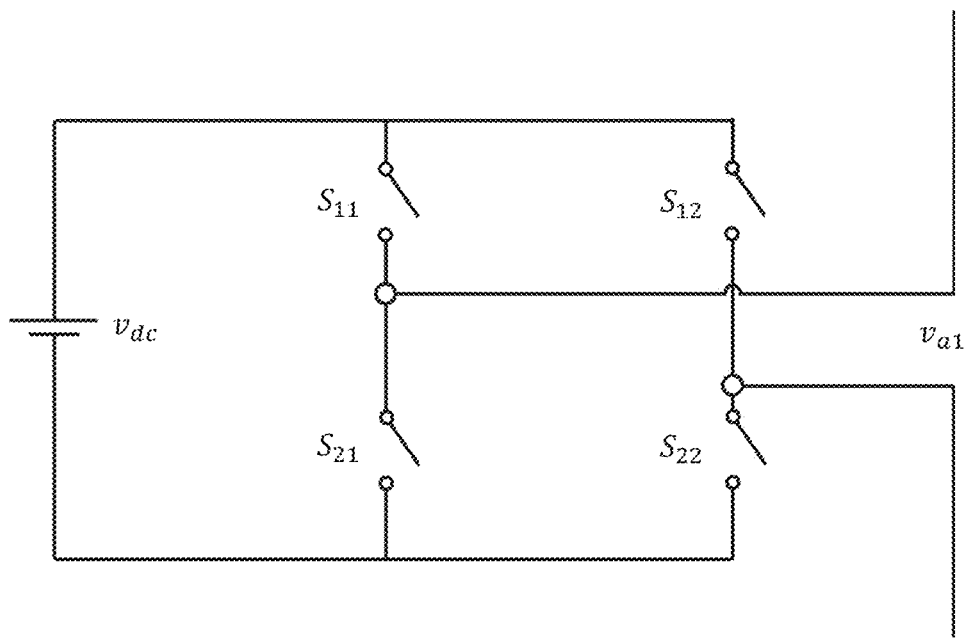
FIG. 3 shows schematically an equivalent circuit representation of the inverter module identified in FIG. 2.

Referring to FIGS. 2 and 3, each inverter module, such as the inverter module 114, comprises a switching circuit, indicated generally at 201, a DC-link circuit, indicated generally at 202, for supplying a DC voltage to the switching circuit from the DC source 108, and a bypass switch circuit, indicated generally at 204, for bypassing the switching circuit 201 of the module.

The switching circuit 201 comprises a plurality of, in the example four, power electronics switches 205, 206, 207 and 208, in an H-bridge configuration. Output terminals 209, 210 are located on opposite branches of the H-bridge switching circuit. As will be understood by the skilled person, by suitable control of the switching sequences of the switches 205 to 208, three different voltage levels, +Vdc, −Vdc, and 0 Vdc, may be supplied by each module to the common conductor 117. Thus, by suitable control of the relative switching sequences of all of the modules in the branch, an AC voltage may be generated on the conductor 117 having a magnitude that is the sum of the voltage outputs of each of the M inverter modules. In the example, each of the power electronics switches 205 to 208 is an insulated-gate bipolar transistor (IGBT). An IGBT is a preferred type of power electronics switch for this application due to its relatively high efficiency, fast switching capability, and high voltage rating. It will be appreciated by the skilled person, however, that the utility of the disclosure is not limited to any particular type of switch, and alternative power electronics switches could be readily deployed in substitute of the IGBTs 205 to 208 in alternative embodiments.

The DC-link circuit 202 comprises conductors 211, 212 arranged in series with the DC source 108, and a DC-link capacitor 213 coupled between the conductors 211, 212 in parallel with the DC source 108. The capacitor 213 thus acts as a buffer to store energy for supply to the switching circuit 201 on demand. The DC-link circuit 202 further comprises a voltage sensor circuit 214 operable to measure the voltage across the capacitor 213 and supply a voltage measurement to the controller 118.

The bypass switch circuit 204 is coupled between the output terminals 209, 210 of the switching circuit 201. The bypass switch circuit 204 comprises a relay 215, that is operable, for example, under the control of controller 118, to controllably make and break the bypass switch circuit 204, to thereby controllably bypass the switching circuit 201 of the module 114. The bypass switch circuit 204 is thus operable to bypass the switching circuit 201 and form an alternative path for current flowing in the conductor 117. Bypassing the switching circuit 201 may be desirable where the switching circuit 201 is experiencing a fault condition, for example, where one or more of the switches 205 to 208 has failed, to thereby isolate the faulty switching circuit 201 from the conductor 117.

The controller 118 is coupled to the power electronics switches 205 to 208 of the switching module 201 of each of the M inverter modules 114 to 116 in each of the Q branches 111 to 113 of the multilevel converter 107. The controller 118 is thus operable to control the switching circuit 201 of each module 114 to thereby control the output AC voltage of each branch 111. In the example, the various functions of the controller 118 are carried out by common or co-located computing devices, but it will be appreciated that the functions could alternatively be carried out by mutually remote computing devices in communication with one another.

Figure 4:
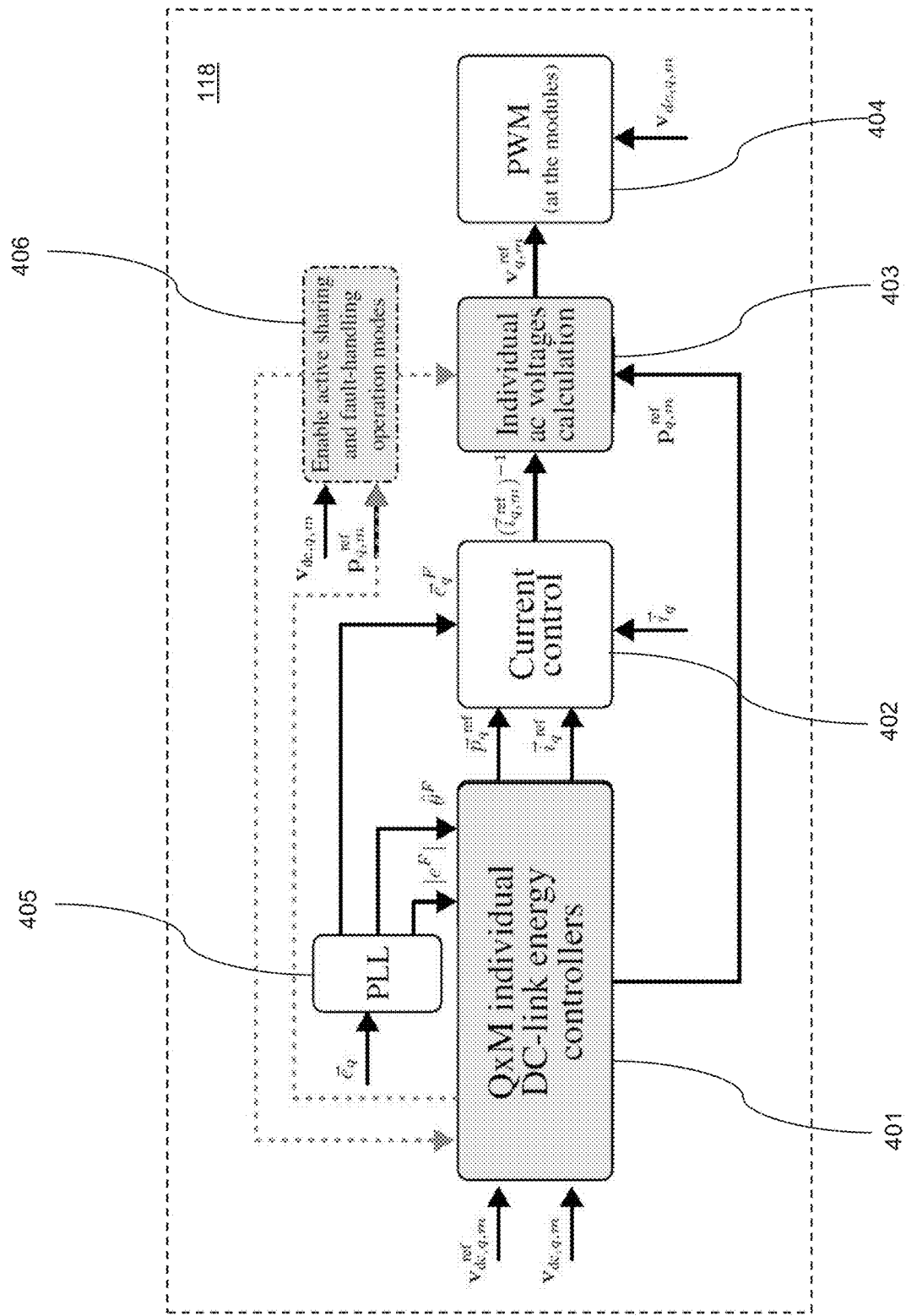
FIG. 4 is a block diagram showing schematically a control scheme for controlling the operation of the multilevel converter.
Figure 5:
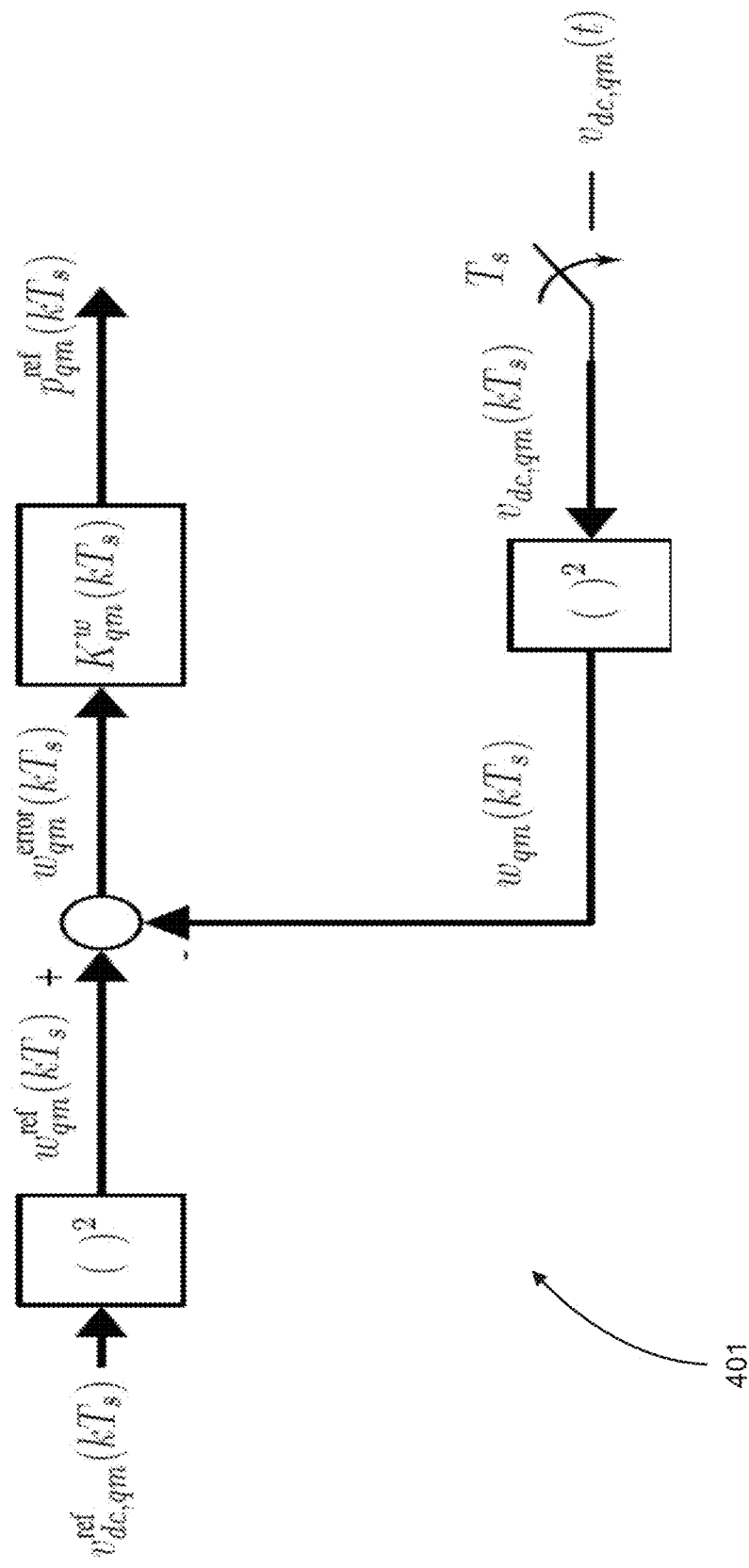
FIG. 5 is a block diagram showing schematically a control scheme for regulating the voltage of the DC-link for each inverter module.

Referring to FIGS. 4 and 5 collectively, the proposed control scheme implemented by the controller is represented schematically using the nomenclature shown in FIG. 1.

The controller 118 implements four main control processes. In summary, at block 401 a reference power value for each module of each branch is calculated, the reference power value defining the magnitude of a power demanded by each DC-link to charge the DC-link capacitor to a predetermined reference voltage; at block 402, a current reference value is generated for each of the Q branches of the converter, the current reference value defining the average current demanded per module; at block 403, an individual AC voltage reference is determined for each module; and at block 404, a pulse width modulation signal is generated for controlling the switching circuit of each module in dependence on the individual AC voltage reference per module and the determined voltage across the capacitor of the module.

Block 401 of the controller 118 represents plural, Q×M (i.e. the number of branches Q of the converter multiplied by the number of modules M in each branch), DC-link energy controllers for controlling the energy stored in the capacitor 213 of the DC-link of each of the M inverter modules of each of the Q branches of the multilevel converter 107. The functions of each of the Q×M DC-link energy controllers are depicted in FIG. 5. Referring to FIG. 5, the inputs to each DC-link energy controller 401 are the Q×M DC-link voltage measurements (vdc,q,m matrix), which may for example be measured using the voltage sensor circuit 214 of each module 114, reference values for the Q×M Dc-link voltages (vrefq,m matrix), grid voltages (eq vector), and AC currents (iq vector). In the example, the reference values for the Q×M DC-link voltages (vrefq,m matrix) are represented as an input to the DC-link energy controllers 401. For example, the voltage reference values could be received from a dedicated memory of the controller 118 external to the DC-link energy controllers 401. Alternatively, however, the reference values could be predefined in internal memory of the DC-link energy controllers 401.

Referring in particular to FIG. 5, before the closed-loop operation, both the measured voltage signals (vdc,q,m matrix) and the reference voltage signals (vrefq,m matrix) are squared. By this operation, the inputs of the closed-loop operation are variables linearly proportional to the energy stored in the DC-link capacitors, which is given by the equation Edc=C/2 vdc2, where C is the capacitance value.

It should be appreciated in this regard that, due for example to tolerance in capacitor components, the real value of C may not be accurately known. However, in the proposed closed-loop mode of operation this error is not problematic, as the C/2 term is included in the loop gains of the closed-loop operation Kqm (kTs), and the squared value w=vdc(t)2, or a variable mathematically equivalent to vdc(t)2, is the controlled variable. This feedback linearization technique thus calculates, on-demand, the power demanded by each DC-link to charge the DC-link capacitor to the reference voltage (vrefq,m matrix).

The output of each DC-link controller 401 is a reference power value. This reference power value is used by block 402 for reference current generation and current control, and by block 403 for individual reference AC voltage calculations.

Referring secondly to block 402, in a first step, the current reference is constructed per branch, i.e., all the individual power references, from the working modules in the branch, are summed to obtain a total branch power demand given by Prefq. Subsequently, active current amplitude is calculated by the equation: |irefq|=Gq Prefq/|eF|, where Gq is a gain factor, and |eF| is the amplitude of the AC grid voltage. In practice, Gq=2 is selected, since in steady state the power per branch is Pq (dc)=|iq||eF|/2.

Next, the current amplitude is multiplied by a sinusoidal signal in-phase with the fundamental component of voltage in the same branch, as defined by the phase-locked loop (PLL) block 405. The angle of this signal can be defined in many equivalent forms, for example, (i) Q individual single-phase synchronization algorithms can synchronize independently, or (ii) using synchronization techniques that track the positive main component dq-PLL. The result from this operation is a vector of AC reference currents irefq, which feed the current control loops. Various suitable alternative PLL synchronization methods for performing the same function will be well known to the skilled person. The amplitude of the AC grid voltage |eF| can also be estimated by a PLL.

The current controller block 402 thus functions as a closed loop controller that aims to follow its current references (Q=1, 2, 3, . . . references in a single/multiphase system). The control action variable, defined per branch, is the total AC branch voltage vq reference. The current control loop may optionally use information defining the grid voltage as a feed-forward.

Once vq reference is calculated by the closed-loop control algorithm, this value is divided over prefq, giving rise to the variable defining the inverse average current per module (irefq,m)−1. It will be appreciated that the (irefq,m)−1 value is directly proportional to the entire branch voltage, but is entirely independent of how this voltage is shared among the modules. This thus advantageously provides a natural decoupling action of the dynamics between modules of a branch.

Referring next to block 403, the power demanded by each module is also used to calculate the reference AC voltage values for the PWM block 404.

The individual voltage references are obtained from the inverse average current variable, which is common to all modules in the same branch, and the individual power demand of each module. The voltage reference per module is then given by the equation: vrefq,m=(irefq,m)−1 prefq,m. The module voltages are then set at the module level using vrefq,m as a PWM input. The DC-link voltages, represented in matrix form as vrefdc,q,m, are typically employed to calculate the module duty cycles, i.e., the AC voltage reference divided by the DC-link voltage, which gives a normalized duty cycle, thereby avoiding any cross-coupling in the circuit. That is to say, by this method, each module only uses its own DC-link voltage value.

This operation takes into account that the power demanded by each DC-link load is proportional to the AC voltage, the current is common to all modules in the branch, so the only degree of freedom to feed the DC-link with the required power is by acting at the module level on the AC voltage references.

Referring finally to block 406, the proposed operation of the converter can be referred to as an "active sharing operation", because the module voltages are a function of real-time power consumption. It will be appreciated, however, that this mode of operation is only practicable in conditions where all modules of the same branch have power demands of the same sign, i.e., where all modules of a branch demand a positive input power, or otherwise, all negative.

This defines a necessary condition to enable the control scheme depicted in FIG. 4. In practice, this condition is fulfilled in normal operations of the system, since in ideal conditions all the modules are sized to share equally the total power available in the DC supply side. However, in practice, the operation of a system may deviate from an ideal operation, and thus the system should be capable of accommodating such a deviation.

Thus, at block 406 a comparison is made between the power demands of each of the modules to determine whether each of the modules has a power demand of the same sign. If the determination is in the affirmative, i.e., if the modules do all have a power demand of the same sign, the voltage reference per module vrefq,m is used in the generation of the pulse width modulation signal by the block 404. In contrast, if it is determined that the power demands of the modules do not have the sign, i.e. if one module demands a positive power and another module demands a negative power, the voltage reference per module vrefq,m is substituted by a value representing an average of the total branch voltage, i.e. set by the function vrefq/M, where M is the number of modules in the branch, to thereby avoid spurious operation of the converter.

Figure 6:
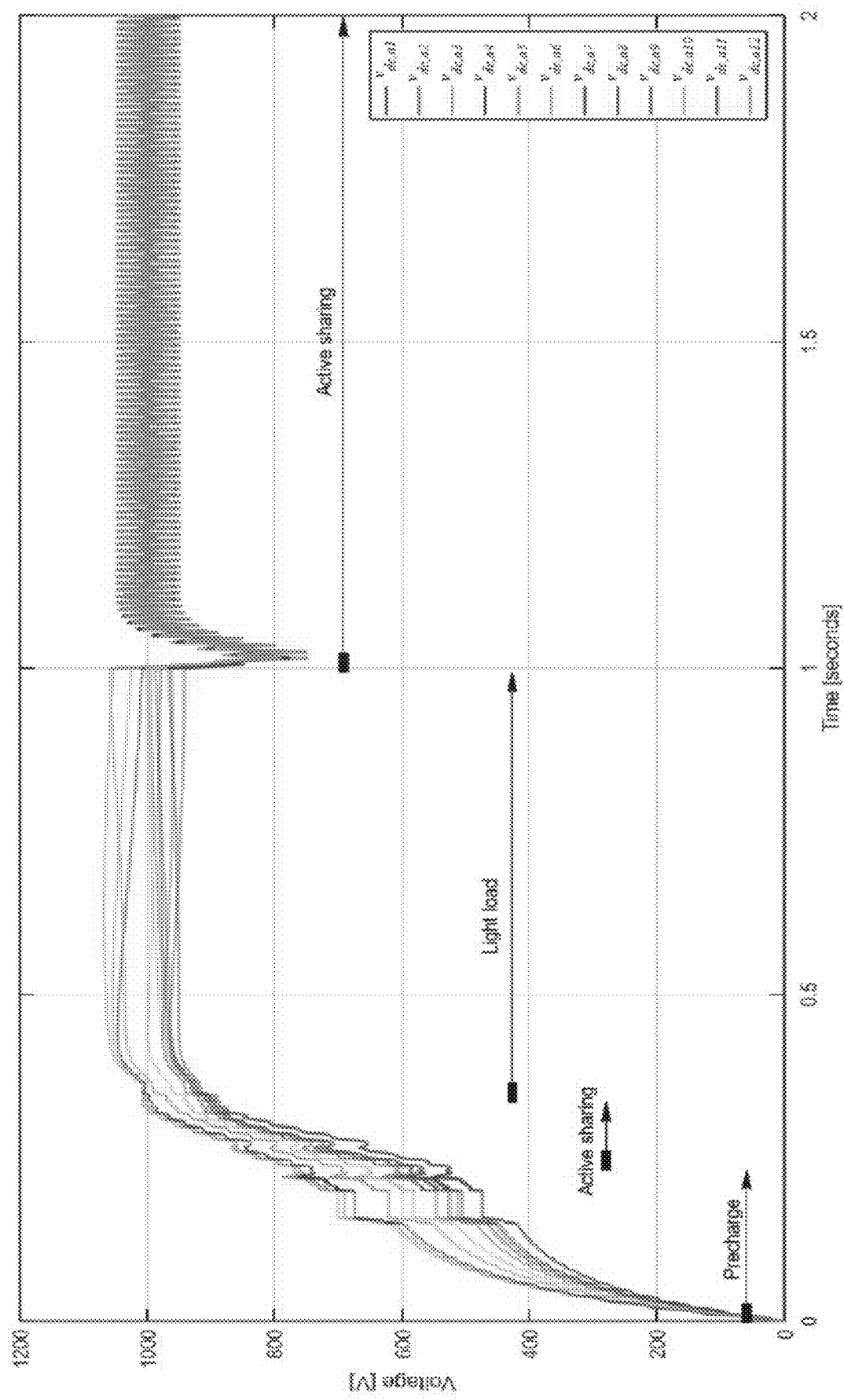
FIG. 6 is a graphical representation of simulated DC-link voltage characteristics achieved by the control scheme depicted in FIG. 4.

FIG. 6 shows simulation results for a multilevel converter as depicted in FIG. 1, where Q=3 and M=12.

In the simulation, the reference working value for each of the DC-link capacitances is set as 1000 Volts, and the capacitance values are randomly assigned within a 20% tolerance of a nominal capacitance value. When loads are connected, at T=1 second, the consumption of the loads are randomly assigned with a 20% tolerance.

During an initial period of operation, from T=0 seconds to T=1 second, an initial sequence is simulated of pre-charging, first activation of the PWM controllers, and a light load operation with active-sharing deactivated. In a subsequent period of operation, beginning at T=1 second, the active-sharing mode of operation is activated under full-load conditions. As will be observed, with active sharing conditions enabled, an average zero error between DC-link voltages is achieved. The simulation thus proves the fast and robust adaptation of the converter when the active-sharing mode of operation is enabled.

Figure 7:
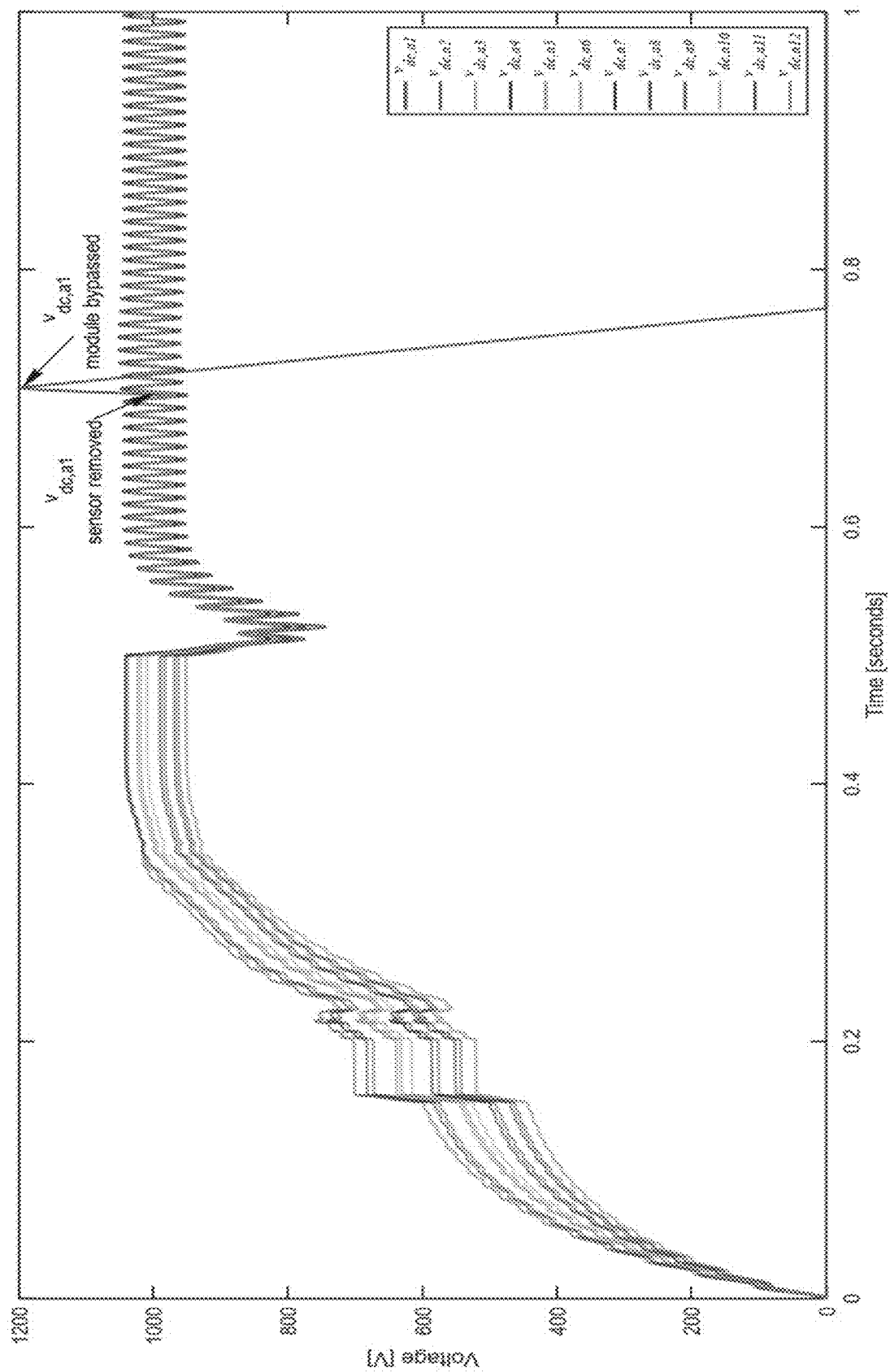
FIG. 7 is a graphical representation of simulated DC-link voltage characteristics achieved by the control scheme depicted in FIG. 4 under a fault condition.

FIG. 7 shows simulation results for a multilevel converter as depicted in FIG. 1, using the same parameters as the simulation depicted in FIG. 6.

In this second simulation, after an initial period of light-load operation in which the DC-link voltage controller reference value is set as vrefq/M, i.e., where the reference value is an average of the total branch voltage, at T=0.5 seconds, a load is connected and the active-sharing mode of operation is enabled. As will be observed, upon initiation of the active sharing mode of operation, the DC-link voltage error tends quickly towards zero, reaching zero at approximately T=0.6 seconds. At approximately T=0.6 seconds a fault condition is simulated, in which the voltage sensor of the module M=1 reports a 0 Volt measurement, thereby resulting in a faulty operation of the associated dc-link controller. The fault condition has the effect of causing the DC-link controller to demand a power consumption above a threshold for charging the DC-link capacitor of the module M=1.

The controller 118 is operable in response to the faulty condition to enact a bypass operation in which the switching circuit 201 of the module 114 is bypassed. In the example, the bypass operation is achieved by closing the relay 215 of the bypass switching circuit to thereby form a short-circuit for current in the branch around the switching circuit of the faulty module. As can be observed, the DC-link capacitor of the faulty module is then discharged, and the operation of the remaining M−1 modules are unaffected. It can thus be observed from the response of the system to the failure of module M=1 that the operation of each module is highly decoupled from the operation of other modules in the branch.

Figure 8:
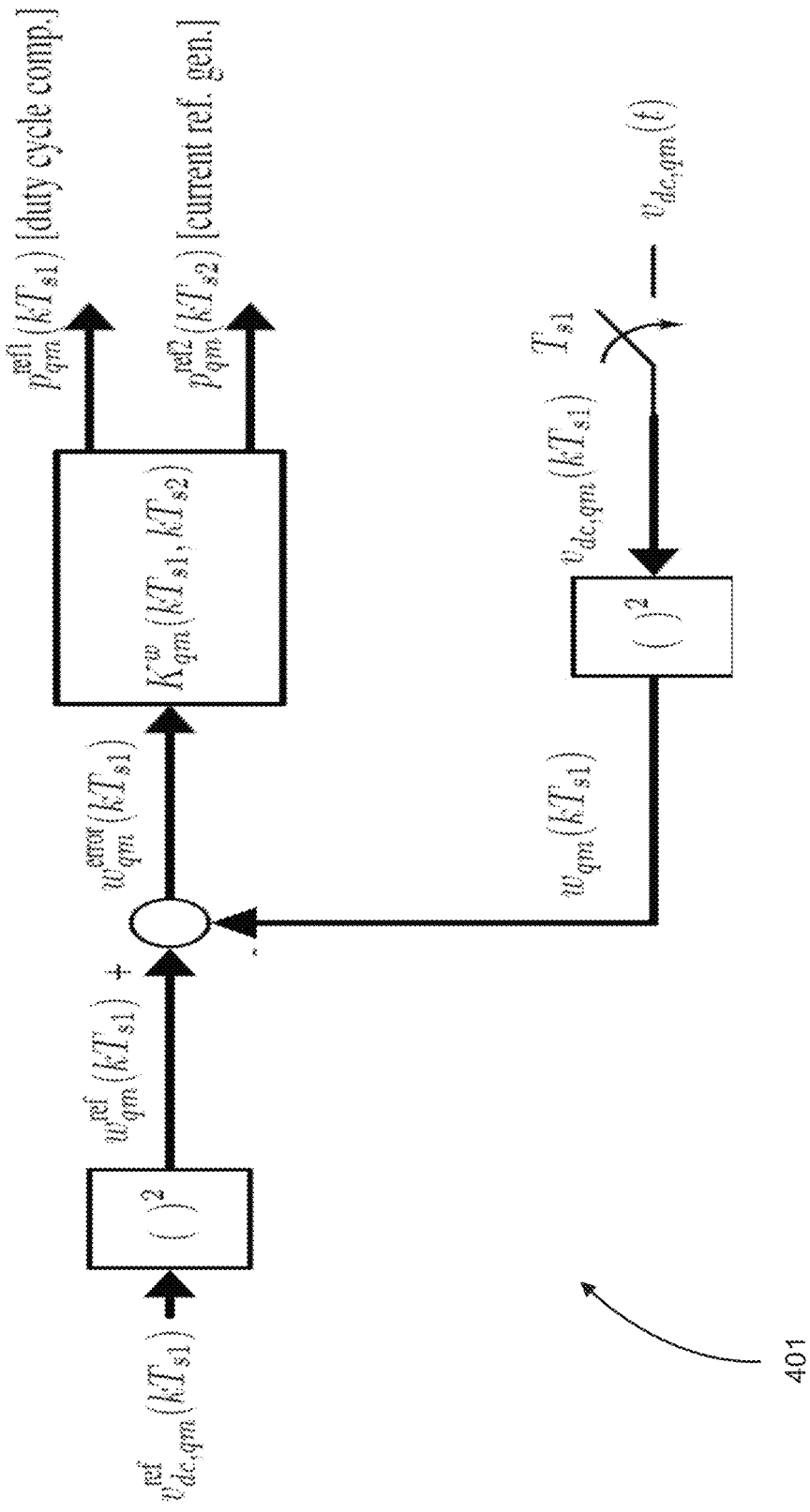
FIG. 8 is a block diagram showing schematically an alternative control scheme for regulating the voltage of the DC-link for each inverter module.

FIG. 8 shows the implementation of the DC-link energy controller considering a multi-task, where two different control samples are considered now Ts1 and Ts2, where Ts1<Ts2.

It will be understood that the nature of the digital controller implementation of the plural Q×M DC-link controllers 401 allows different tasks of the control to be shared among different physical devices. However, such task-sharing may cause latencies in communication between the different devices, which may in turn result in delays in the control system. In practice therefore it may be desirable that the current control task is implemented by a device that has information from all power references in the same branch. However, the duty cycle calculation can be made at the module level. Implementing duty cycle calculations at the module level may be relatively faster, since communication between different devices is avoided.

Although the present disclosure and its advantages have been described in detail, it should be understood that various changes, substitutions and alterations can be made herein without departing from the spirit and scope of the disclosure as defined by the appended claims. In the claims, the word "comprising" does not exclude other elements or steps, and the indefinite article "a" or "an" does not exclude a plurality.

The invention claimed is:

1. A cascaded multilevel converter comprising a plurality of modules coupled together to form a branch, each of the plurality of modules comprising a switching circuit and a DC link for supplying a DC voltage to the switching circuit, and a controller for controlling the switching circuit of each of the plurality of modules to generate an AC voltage in the branch, wherein the controller is configured to:
   determine, for each of the plurality of modules, a voltage across a capacitor of the DC link of the module;
   determine, for each of the plurality of modules, a reference power value for charging the capacitor of the DC link of the module to a reference voltage value for the module;
   determine, from the reference power values of the plurality of modules, a common reference AC current value for AC current in the branch;
   determine, from the common reference AC current value, a common reference AC voltage value for an AC voltage in the branch;
   determine, for each of the plurality of modules, a reference AC voltage value using the common reference AC voltage value and the reference power value for the module; and
   generate a pulse width modulation signal for controlling the switching circuit of each of the plurality of modules based on the reference AC voltage value for the module and the voltage across the capacitor of the module,
      wherein the reference power value for each of the plurality of modules is determined based on a difference between squared values of the voltage across the capacitor of the DC link of the module and the reference voltage value for the module.

2. A cascaded multilevel converter as claimed in claim 1, wherein the reference voltage value for each of the plurality of modules is a predetermined value stored in memory in the controller.

3. A cascaded multilevel converter as claimed in claim 1, wherein the controller comprises a reference current control device configured to receive the reference power values for the plurality of modules and determine the common reference AC current value.

4. A cascaded multilevel converter as claimed in claim 2, wherein the controller comprises a reference current control device configured to receive the reference power values for the plurality of modules and determine the common reference AC current value.

5. A cascaded multilevel converter as claimed in claim 1, wherein the controller comprises a reference current control device configured to receive the reference power values for the plurality of modules and determine the common reference AC current value.

6. A cascaded multilevel converter as claimed in claim 1, wherein the controller comprises a plurality of switching circuit control devices each configured to receive the reference AC voltage value of one of the plurality of modules and control the switching circuit of that module.

7. A cascaded multilevel converter as claimed in claim 1, wherein the controller is configured to:
   control the switching circuit of each of the plurality of modules in accordance with an initial mode of operation,
   determine power demands of the plurality of modules,
   determine whether each of the plurality of modules has a power demand of a same sign, and
   control the switching circuit of each of the plurality of modules when each of the plurality of modules has a power demand of a same sign.

8. A cascaded multilevel converter as claimed in claim 1, wherein the controller is further configured to compare the voltage of at least one of the plurality of modules to a threshold voltage, and, in response to the voltage of the module being higher or lower than the threshold voltage, configure the module to form a path for an AC voltage in the branch that bypasses the DC link of the module.

9. A cascaded multilevel converter as claimed in claim 8, wherein the module further comprises a relay operable by the controller to bypass the switching circuit of the module, wherein configuring the module to form a path for an AC voltage in the branch that bypasses the DC link of the module comprises configuring the relay to bypass the switching circuit of the module.

10. A cascaded multilevel converter as claimed in claim 1, wherein the switching circuit of each of the plurality of modules is configured as an H-bridge.

11. A cascaded multilevel converter as claimed in claim 1, comprising a plurality of further modules coupled together to form a further branch, each of the plurality of further modules comprising a switching circuit and a DC link for supplying a DC voltage to the switching circuit, and a controller for controlling the switching circuit of each further module to generate an AC voltage in the further branch, wherein the further branch is arranged in parallel to the branch.

12. A cascaded multilevel converter as claimed in claim 11, wherein the branch and the further branch have the same number of modules.

13. A cascaded multilevel converter as claimed in claim 1, wherein the reference power value for each of the plurality of modules is determined using a digital filter.

14. A cascaded multilevel converter as claimed in claim 13, wherein the controller is configured to compare the reference power value to a threshold power value and implement an anti-windup operation when the reference power value exceeds the threshold power value.

15. A method of controlling a cascaded multilevel converter comprising a plurality of modules coupled together to form a branch, each of the plurality of modules comprising a switching circuit and a DC link for supplying a DC voltage to the switching circuit, and the method comprising:
  determining, for each of the plurality of modules, a voltage across a capacitor of the DC link of the module;
  determining, for each of the plurality of modules, a reference power value for charging the capacitor of the DC link of the module to a reference voltage value for the module;
  determining, from the reference power values of the plurality of modules, a common reference AC current value for AC current in the branch;
  determining, from the common reference AC current value, a common reference AC voltage value for an AC voltage in the branch;
  determining, for each of the plurality of modules, a reference AC voltage value using the common reference AC voltage value and the reference power value for the module; and
  generating a pulse width modulation signal for controlling the switching circuit of each of the plurality of modules based on the reference AC voltage value for the module and the voltage across the capacitor of the module,
  wherein the reference power value for each of the plurality of modules is determined based on a difference between squared values of the voltage across the capacitor of the DC link of the module and the reference voltage value for the module.

16. A controller for controlling a cascaded multilevel converter to generate an AC voltage in an output branch, wherein the cascaded multilevel converter comprises a plurality of modules, and the controller is configured to:
  determine, for each of the plurality of modules of the cascaded multilevel converter, a voltage across a capacitor of a DC link of each of the plurality of modules;
  determine, for each of the plurality of modules, a reference power value for charging a capacitor of the DC link of the module to a reference voltage value for the module;
  determine, from the reference power values of the plurality of modules, a common reference AC current value for AC current in the output branch;
  determine, from the common reference AC current value, a common reference AC voltage value for an AC voltage in the output branch;
  determine, for each of the plurality of modules, a reference AC voltage value using the common reference AC voltage value and the reference power value for the module; and
  generate a pulse width modulation signal for controlling a switching circuit of each of the plurality of modules based on the reference AC voltage value for the module and the voltage across the capacitor of the module,
  wherein the reference power value for each of the plurality of modules is determined based on a difference between squared values of the voltage across the capacitor of the DC link of the module and the reference voltage value for the module.

* * * * *

UNITED STATES PATENT AND TRADEMARK OFFICE
CERTIFICATE OF CORRECTION

| | | |
|---|---|---|
| PATENT NO. | : 12,463,522 B2 | Page 1 of 1 |
| APPLICATION NO. | : 17/941169 | |
| DATED | : November 4, 2025 | |
| INVENTOR(S) | : Francisco Daniel Freijedo Fernández | |

It is certified that error appears in the above-identified patent and that said Letters Patent is hereby corrected as shown below:

In the Specification

Column 7, Line 38, change "0 Vdc" to --0Vdc--.

Signed and Sealed this
Second Day of December, 2025

John A. Squires
*Director of the United States Patent and Trademark Office*